(12) United States Patent
Ehrlich et al.

(10) Patent No.: US 6,904,811 B2
(45) Date of Patent: *Jun. 14, 2005

(54) APPARATUS FOR MEASURING THE FLOW VELOCITY AND/OR FLOW THROUGHPUT OF FLUIDS

(75) Inventors: Andreas Ehrlich, Dresden (DE); Gerry Schroeter, Dresden (DE)

(73) Assignee: Sick AG, Waldkirch (DE)

( * ) Notice: Subject to any disclaimer, the term of this patent is extended or adjusted under 35 U.S.C. 154(b) by 125 days.

This patent is subject to a terminal disclaimer.

(21) Appl. No.: 10/243,041

(22) Filed: Sep. 13, 2002

(65) Prior Publication Data

US 2003/0051559 A1 Mar. 20, 2003

(30) Foreign Application Priority Data

Sep. 14, 2001 (DE) .......................................... 101 45 566

(51) Int. Cl.⁷ ............................................... G01F 1/66
(52) U.S. Cl. .................................................. 73/861.26
(58) Field of Search ........................ 73/861.26, 861.28, 73/861.52, 861.56, 861.23, 861.24, 861.42, 861.22, 861.25, 861.29

(56) References Cited

U.S. PATENT DOCUMENTS

| | | | | |
|---|---|---|---|---|
| 4,631,967 A | * | 12/1986 | Welker ...................... | 73/861.25 |
| 4,735,094 A | * | 4/1988 | Marsh ....................... | 73/861.24 |
| 4,988,155 A | * | 1/1991 | Harner et al. .................. | 385/12 |
| 5,090,871 A | * | 2/1992 | Story et al. ...................... | 417/9 |
| 5,445,035 A | * | 8/1995 | Delajoud ................... | 73/861.52 |
| 5,461,931 A | | 10/1995 | Gill | |
| 6,038,927 A | * | 3/2000 | Karas .......................... | 73/706 |
| 6,053,053 A | * | 4/2000 | Huotari ................... | 73/861.22 |
| 6,098,466 A | * | 8/2000 | Shkarlet ................... | 73/861.25 |
| 6,557,417 B1 | * | 5/2003 | Liu ............................. | 73/714 |
| 6,675,658 B2 | * | 1/2004 | Petrich et al. ................ | 73/756 |

FOREIGN PATENT DOCUMENTS

| | | |
|---|---|---|
| DE | 44 39 399 A1 | 5/1996 |
| DE | 29621964 U1 | 4/1997 |
| DE | 197 13 526 A1 | 8/1998 |
| DE | 19713526 A1 | 10/1998 |
| DE | 29715090 U1 | 10/1998 |
| DE | 19729473 A1 | 2/1999 |
| EP | 0 890 826 A1 | 1/1999 |
| JP | 08240458 | 9/1996 |
| JP | 08271303 | 10/1996 |
| WO | WO 9613701 A2 | 5/1996 |

\* cited by examiner

*Primary Examiner*—Max Noori
(74) *Attorney, Agent, or Firm*—Townsend and Townsend and Crew LLP

(57) ABSTRACT

A flow meter, such as a gas meter, for measuring the flow velocity and/or the volumetric through-flow of fluids. The flow meter has a body with connecting flanges for connecting the meter to a pipeline for the fluids. The meter has a tubular center piece that, on its exterior, has at least two receptacles, each of which receives a measuring device. The measuring devices are coupled to a signal processing unit. Electrical cabling between the measuring devices (probes) and the signal processing unit is completely covered against damage from the exterior by partially guiding the cables through bores in walls of the center piece of the flow meter and by covering portions of the cable and protruding sections of the probes with a cap.

8 Claims, 5 Drawing Sheets

APPARATUS FOR MEASURING THE FLOW VELOCITY AND/OR FLOW THROUGHPUT OF FLUIDS

BACKGROUND OF THE INVENTION

This invention relates to instruments for measuring the flow velocity and/or the volumetric through-flow of fluids in conduits such as pipelines.

Today's flow-through measurement processes use amongst others ultrasound counters for measuring the through-flow. In general, this involves placing a flow meter with appropriate connecting flanges into a segment of a pipeline. The flow meter has ultrasound converters, or ultrasound probes, which are mounted in a tubular section of the flow meter. A signal processing unit is provided for controlling the ultrasound probes and processing signals generated by the probes.

This technique measures a difference in the travel time (from emission to receipt) of two ultrasound signals which are emitted in one direction and then returned and have a component in the flow direction of the fluid through the flow meter, and another component in the opposite direction. It is necessary that the signals are emitted and received at an angle other than 90° to the flow direction.

All ultrasound counters have the common characteristic that the probes extend at an oblique angle from an otherwise tubular, round body of the flow meter. Each probe requires an electric connection with a signal processing unit. Accordingly, one or more cables that necessarily protrude from each probe are essentially unprotected all the way to the signal processor. To protect against explosion dangers, the cables are partially encased in separate tubes that are mounted to the flow meter.

Flow meters, such as the above-mentioned ultrasound counters, are used in rough industrial environments, for example in the chemical industry, at natural gas wells, at filling stations, or on transmission lines. In such environments, the flow meters, which, depending on their diameter, can be very heavy, must be handled with heavy equipment such as fork lifts and the like.

Such rough handling creates the danger of damaging or severing unprotected cables during installation, inspection or maintenance. As a result, the counters are often installed without cables. This renders the flow meter and its flanges more accessible and reduces the danger of downtimes due to damaged or severed cables. However, it significantly increases the installation time and effort and the costs associated therewith.

SUMMARY OF THE INVENTION

It is an object of the present invention to provide a flow meter which eliminates the above-mentioned shortcomings of prior art flow meters.

It is a further object of the invention to provide such flow meters which are lighter in weight, more easily handled, and which are better protected against damage from the exterior.

According to the present invention, the electric connections between the measuring devices and the signal processing unit extend at least partially through and are thereby at least partially protected by the body of the flow meter.

The electric connectors or cables can be integrated into the walls of the flow meter. This has the particular advantage of completely protecting the electrical cables against accidental or intentional damage or destruction. The likelihood of downtimes for the flow meter is thereby significantly reduced. A further advantage for having covered cables is that the flow meter is much more easily handled since there are no free, potentially interfering cables to contend with. When the cables are covered over their entire length, which is preferred, maximum cable protection is obtained. Installing the cables after the installation of the entire flow meter, for example in a gas pipeline, is no longer necessary since the cables of the flow meter are pre-installed. In addition, the cables are protected against the atmospheric and environmental dangers, such as animals gnawing on them, which enhances the life cycle of the instrument. Covered cables are completely protected from such dangers.

By at least partially integrating the cables into the flow meter body, the resulting cable protection makes other protective measures, such as more insulation or providing separate protective conduits, superfluous. Both a reduction in cost and simplified installation are thereby attained. In addition, covering the cables provides a simple and cost-effective protection against most explosion dangers.

In one of the preferred embodiments of the invention, the cables of the flow meter are at least partially integrated into the flow meter by making the flow meter walls sufficiently thick so that the cables can be guided through appropriate openings or bores therein.

Such integration of the cables into the walls can be attained in various ways, such as with a separately covered recess or groove through which the cable extends. In a presently preferred embodiment of the invention, the cables extend through bores in the center piece of the flow meter. This provides a simple and optimally stable protection for the cables.

The cables are coupled to the measuring devices, or probes. As a result, at least their ends cannot be integrated into, that is, arranged inside, the flow meter. To nevertheless provide protection, another aspect of the invention places a cap over the measuring device and the cable portions connected thereto. This allows one to use simpler and more cost-effective connectors since the connection does not require great strength, and the cap protects the connection against environmental influences.

Complete, optimal protection for the cables over their entire lengths is obtained when the bores extend from the area covered by the cap to the area where the cables are connected to the signal processing unit carried by the flow meter.

The center piece and the connecting flanges of the flow meter are made from a single piece. This eliminates the need for welding, which is costly when precision-machined products are involved, requires costly inspections, and can lead to thermal distortions of the product. The body of the flow meter is preferably made by a casting process. A casting process is particularly advantageous when it is not necessary to produce intricately shaped stubs and the like. Machining such a monolithically built flow meter to give it its desired final shape can be limited to locations on the flow meter requiring precision and/or predefined surface finishes, for example where the receptacles for the measuring devices are to be installed.

In a preferred embodiment of the invention, the flow meter has a tubular center piece that carries, on its exterior, a pair of diametrically opposed, substantially planar mounting surfaces. Measuring devices arranged on the opposing mounting surfaces define a measuring axis. The mounting surfaces are parallel to each other and at an angle to the longitudinal axis through the center piece.

In this embodiment, linearly emitting ultrasound probes can be installed. In a particularly simple manner, the planar mounting surfaces that are arranged at an angle to the axis of the flow meter assure an exact emission and reception direction for the ultrasound. The angle is selected so that the respective mounting surfaces can be readily precision machined without interference from the connecting flanges while providing ready access to the measuring devices carried on the mounting surfaces and facilitating the installation of the protective caps.

In a further embodiment, the mounting surfaces are arranged so that sufficient space is left on a side of the center piece not occupied by a mounting surface for installing the signal processing unit. In such an event, no separate mounting structure is needed. The signal processing unit can be attached directly to the center piece of the flow meter, for example with screws. The cables then extend from the flow meter to and through the base of a housing for the signal processing unit.

In a preferred embodiment, the apparatus of the present invention is used as a gas counter.

DESCRIPTION OF THE PREFERRED EMBODIMENTS

Figure 1A:
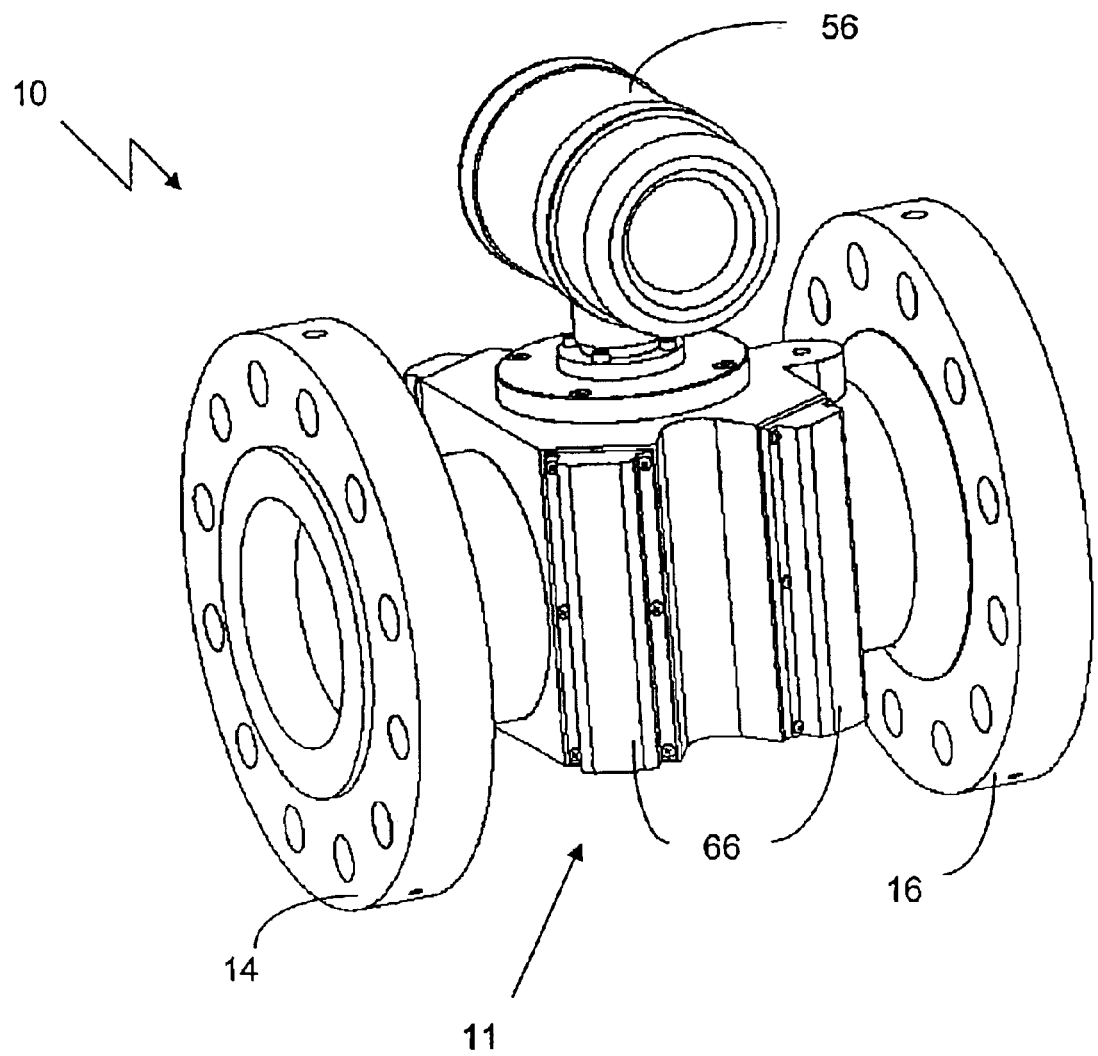
FIG. 1A is a perspective front elevation of a device constructed in accordance with the invention.

A device 10 for measuring the flow velocity and/or through-flow (throughput) of a fluid is shown in FIG. 1A and is formed by a flow meter 11 and a signal processing unit 56. As is further described below, sensors, for example ultrasound converters, hereafter sometimes also referred to as probes, are carried by the flow meter and connected to the signal processing unit with connector cables. The probes and connector cables are not visible in FIG. 1A, which is also an objective of the invention, as is explained in the following.

Flow meter 11 has a tubular center piece 12 arranged between connecting flanges 14 and 16. The interior of the center piece 12 is preferably cylindrical with a diameter D for connection to a pipeline (not separately shown) carrying a fluid.

On its exterior, center piece 12 has at least two and preferably four substantially planar mounting surfaces 18, 20, 22 and 24. Pairs of the mounting surfaces are parallel, diametrically opposed, and define mounting surface pairs 18–20 and 22–24, respectively. The mounting surfaces 18, 20, 22 and 24 are arranged at an angle to the longitudinal axis 26 of center piece 12, which also defines the axis of the entire flow meter. The mounting surface pairs 18–20 and 22–24 are rotated relative to an axis 28 which is parallel to the mounting surfaces and perpendicular to the longitudinal axis 26. This allows a space and material saving arrangement of the four mounting surfaces.

In the illustrated embodiment, the angle between a line perpendicular to the mounting surfaces and the longitudinal axis 26 is approximately 60°. Other angles are also possible. The angle should be selected so that the mounting surface is readily reachable with the required working tools and according to the extent to which the measurement axis described below should be angularly inclined.

In this arrangement, adjacent mounting surfaces 18 and 22 and 20 and 24, respectively, are mirror symmetric to a center plane 30 that is perpendicular to longitudinal axis 26.

In the preferred embodiment, the length L of flow meter 11 is about three times its nominal diameter D.

Figure 3:
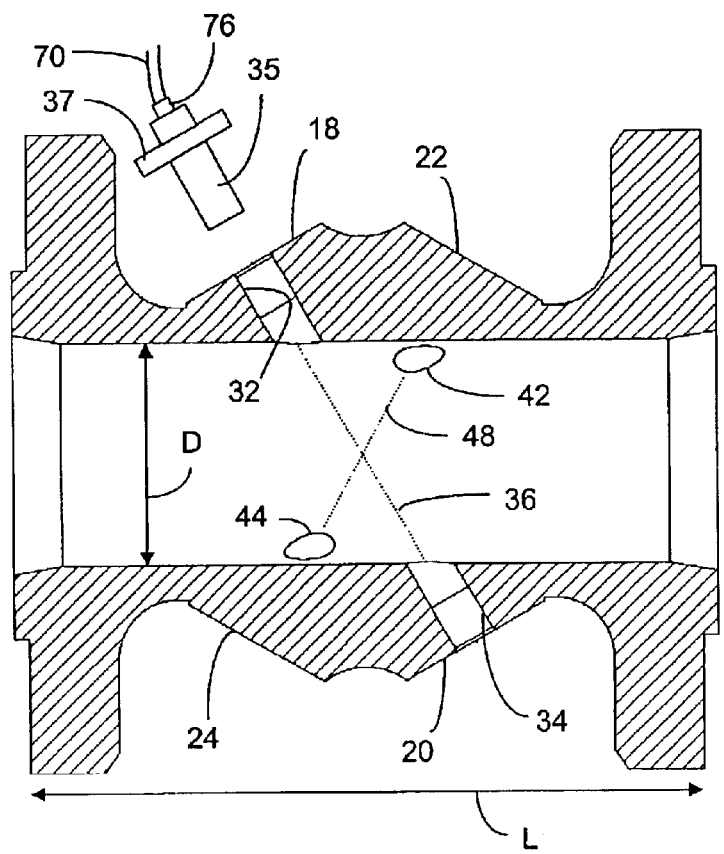
FIG. 3 is a cross-section taken along line III—III of FIG. 1B.

Mounting surfaces 18 and 20 each have a receptacle, e.g. bores 32 and 34, into which the earlier mentioned probes are placed. In FIG. 3, such a probe 35 is schematically illustrated. Bores 32 and 34 are precisely aligned so that the probes 35 placed into the bores are in alignment and define a measurement axis 36. The probes linearly emit and receive the ultrasound in the direction of measurement axis 36. In the illustrated embodiment, measurement axis 36 intersects axis 26 of the flow meter.

Figure 4:
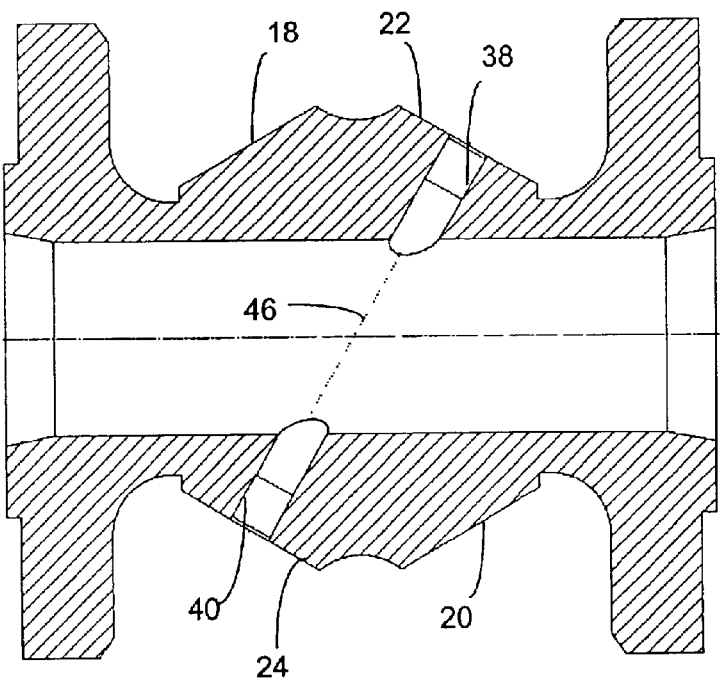
FIGS. 4 to 6 are cross-sectional views taken along lines IV—IV, V—V and VI—VI of FIG. 1B.

For measuring flow in areas offset from the center axis, probe receiving bores 38, 40 (FIG. 4) and 42, 44 (FIG. 3) are provided in mounting surfaces 22 and 24. These bores are arranged so that they define measurement axes 46, 48 that are spaced from the center of the tubular cross-section of flow meter 11 and at a distance from measurement axis 26.

Figure 1B:
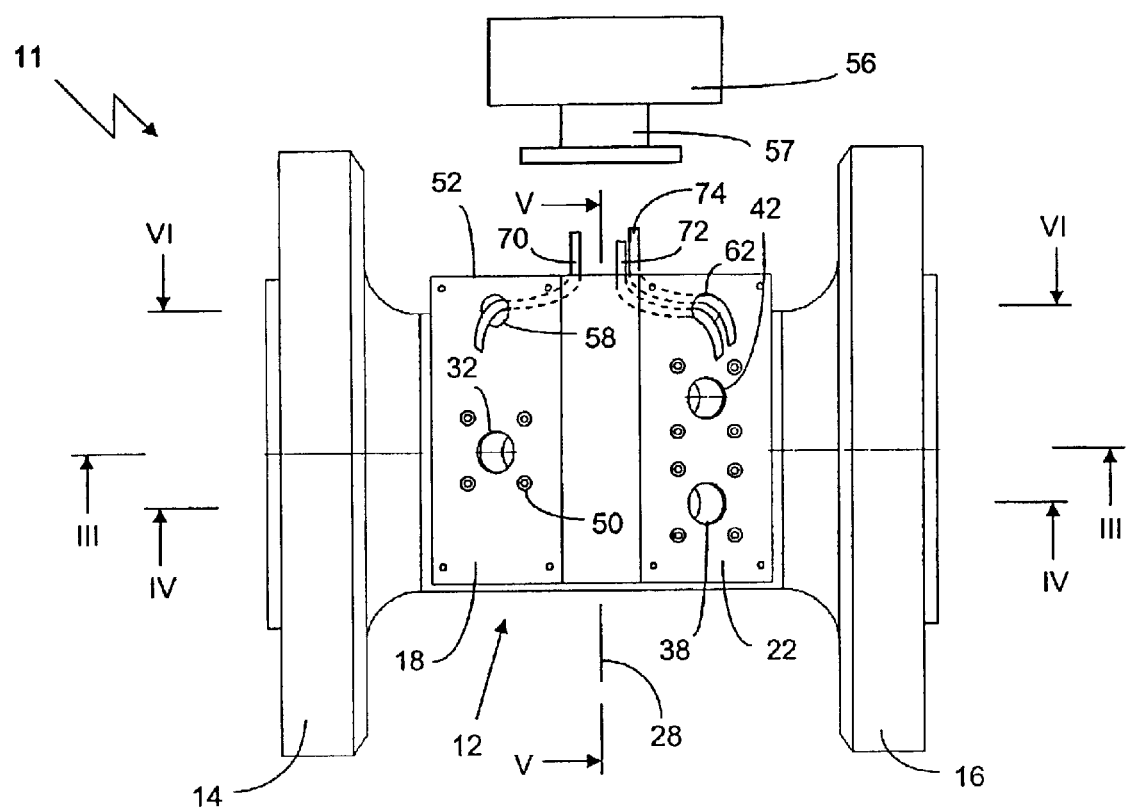
FIG. 1B is a side elevational view of a flow meter constructed in accordance with the present invention and including a signal processing unit.
Figure 2:
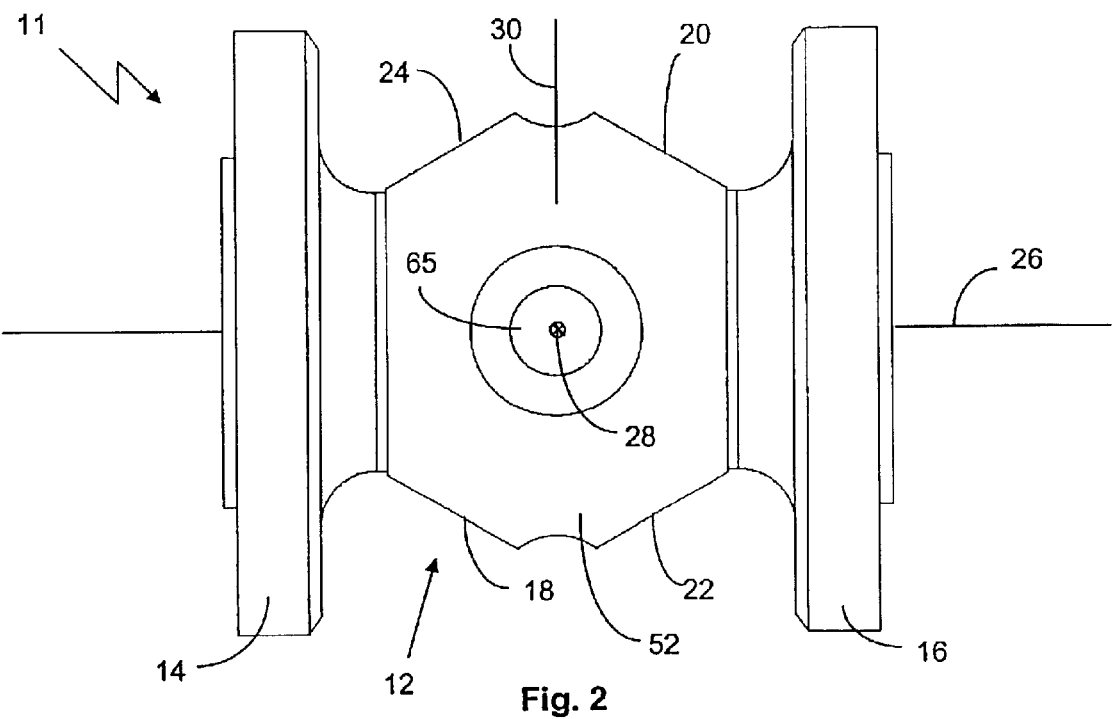
FIG. 2 is a plan view of the flow meter shown in FIG. 1B.

The illustrated embodiment of the invention has three measurement axes 36, 46 and 48. It is possible to provide additional measurement axes in like manner. However, the probes have mounting flanges 37 (FIG. 3) which abut against mounting surfaces 18, 20, 22 and 24 and which are secured thereto with appropriate fasteners, such as bolts engaging threaded bores 50 (FIG. 1B). The number of probes that can be mounted on any given mounting surface depends on the size of their mounting flanges 37. To increase the number of probes, the probes can alternatively be threaded directly into correspondingly threaded bores and secured thereto with cap nuts (not shown), in which event the number of possible measurement axes will be limited by the outer diameters of the cap nuts.

Figure 5:
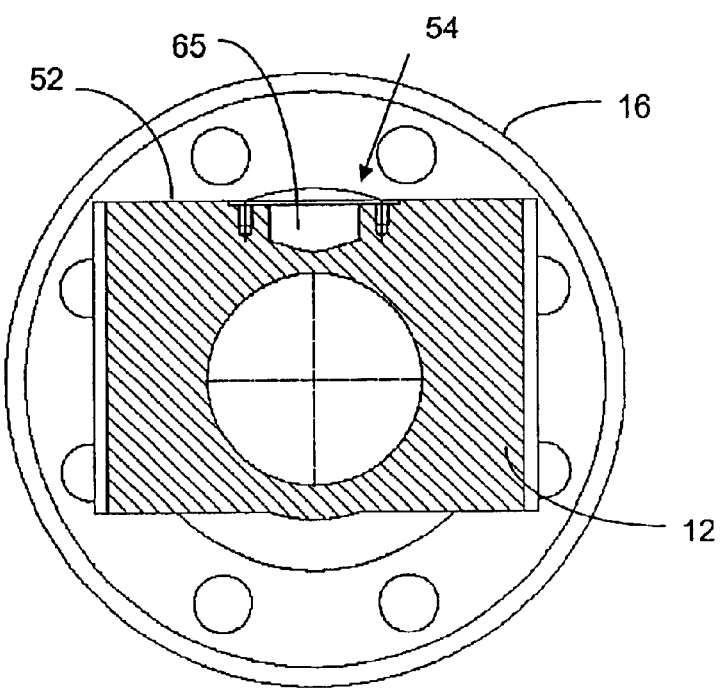
Figure 6:
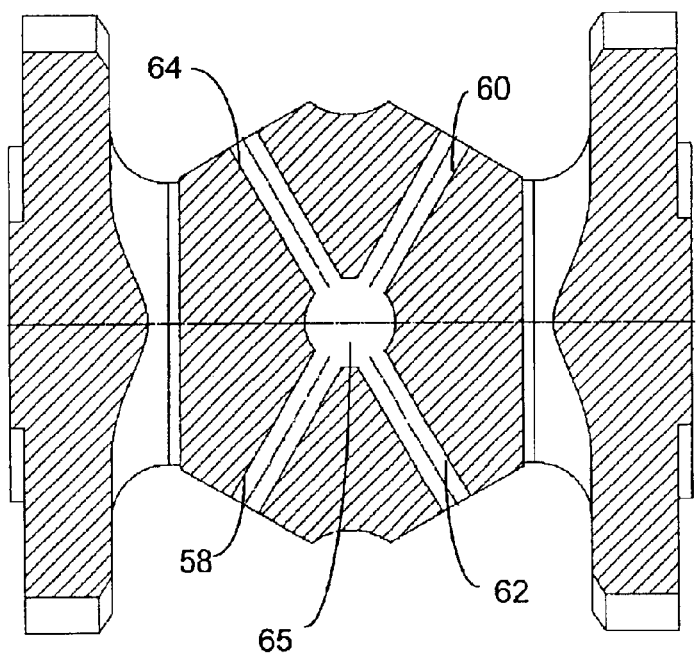

Upper surface 52 of flow meter 11 is planar and includes a mounting area 54 for a signal processing unit 56 (FIGS. 5 and 6). Mounting surfaces 18, 20, 22 and 24 extend all the way to upper surface 52. The wall thickness of center piece 12 in the vicinity of upper surface 52 is sufficiently large so that bore conduits 58, 60, 62 and 64 can be arranged approximately parallel to upper surface 52. These conduits extend from mounting surfaces 18, 20, 22 and 24 to a recess 65 in mounting area 54 (FIGS. 5 and 6).

Electrical cables extend through conduits 58, 60, 62 and 64 as well as recess 65 from signal processing unit 56 via a mounting base 57 thereof to the individual probes. Three of such electrical cables 70, 72 and 74 are illustrated in FIG. 1B by way of example. Cables 70, 72 and 74 provide probes 35 with electric power and transmit signals between the probes and the signal processing unit. Signal processing unit 56 is sometimes also referred to as a measurement converter. FIG. 3 illustrates one of probes 35 with a connector 76 connecting the probe with cable 70.

Optimal protection is provided by guiding cables 70, 72 and 74 from signal processing unit 56 to the exit at mounting surfaces 18, 20, 22 and 24 through the walls of center piece 12 and inside mounting base 57.

Figure 7:
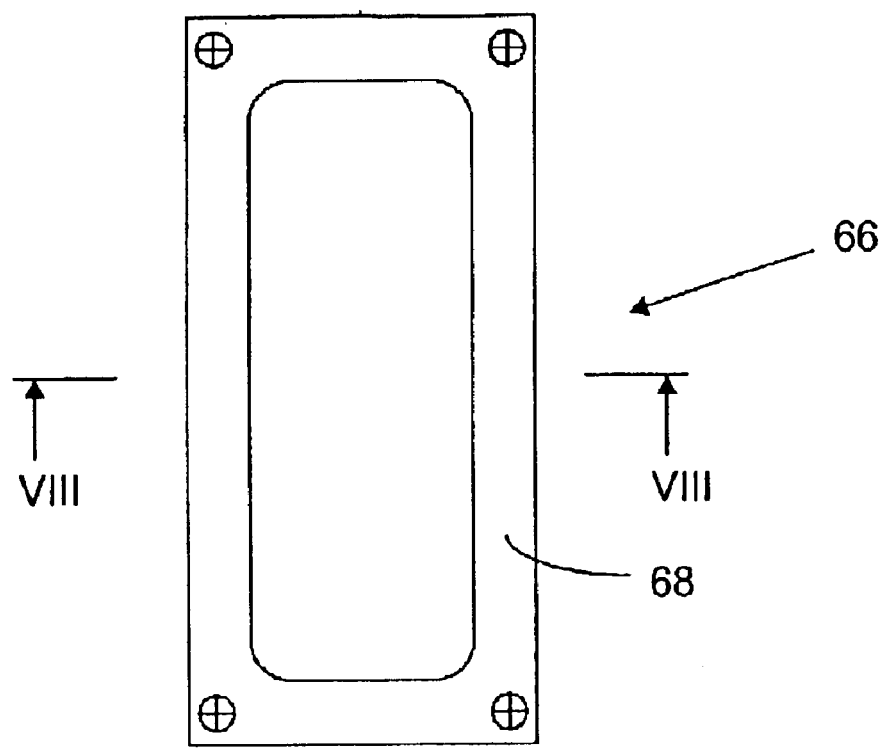
FIG. 7 is an elevational view of a cap forming part of the present invention.
Figure 8:
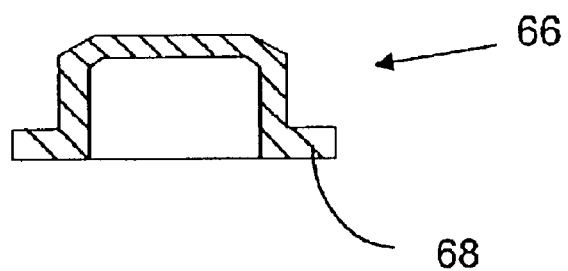
FIG. 8 is a cross-section of the cap shown in FIG. 7 and is taken along the line VIII—VIII.

A cap 66 protects portions of cables 70, 72 and 74 between their exit from mounting surfaces 18, 20, 22 and 24 and connectors 76. There is one cap 66 for each of the mounting surfaces. The cap also protects the portions of the probes projecting from the mounting surfaces. One such cap is shown in FIGS. 7 and 8. FIG. 1A shows two caps installed on flow meter 11.

Caps 66 are suitably secured to center piece 12, for example with four screws each. Caps 66 are preferably shaped and dimensioned so that their peripheries 68 correspond to the edges of the respective mounting surfaces so that the caps cover the entire mounting surfaces.

Flow meter 11 is of unitary construction, that is, its center piece 12, connecting flanges 14 and 16, as well as receptacles 32, 34, 38, 40, 42 and 44 for the measuring instruments are of unitary construction and made of a single piece of material to avoid having to weld or similarly interconnect a plurality of workpieces into a flow meter body. The flow meter 11 is preferably produced by first casting it and thereafter precisely machining those surfaces where precision is required, for example mounting surfaces 18, 20, 22 and 24 and probe receptacles 32, 34, 38, 40, 42 and 44.

The complete flow meter is shown in FIG. 1A, which clearly shows that there are no exposed cables. In FIG. 1A, flanges 14 and 16 of flow meter 11, as well as caps 66 and signal processing unit 56, are visible.

The fluid flow through the interior of flow meter 11 is determined by measuring the time difference between the release and reception of ultrasound signals directed in and against the flow direction of the fluid. The flow velocity and therewith the flow-through volume are then calculated from this difference. The ultrasound probes 35 serve both as emitters and receptors so that each measuring axis can be used for sending ultrasound signals in both directions.

To prevent non-uniformities in the flow-through profile over the cross-section of the flow from adversely affecting the results, multiple measuring axes 36, 46 and 48 are provided which analyze the flow-through profile at diverse locations and at different distances from the axis 26 of the flow meter. The individual results from the various measurement axes are then combined and appropriately integrated to arrive at the volumetric flow-through.

What is claimed is:

1. Apparatus for measuring at least one of a flow velocity and a volumetric through-flow of a fluid comprising a flow meter body defining a through conduit for the fluid with a longitudinal axis and having connecting flanges for connecting the body to a pipeline for the fluid, the body including a tubular center piece with at least two receptacles which are open on the exterior of the body and which are arranged at an oblique angle relative to the longitudinal axis, a measurement device in each of the at least two receptacles, a signal processing unit attached to the exterior of the body, and electrical connectors extending from the measurement devices to the signal processing unit, the body having a wall with a plurality of protective conduits arranged inside the wall which house at least portions of the electrical connectors, each protective conduit including a first open end on the exterior of the body proximate the measurement device and a second open end on the exterior of the body proximate the signal processing unit.

2. Apparatus according to claim 1 including at least one cap covering the measurement device and at least a portion of the associated electrical connector.

3. Apparatus according to claim 2 wherein the conduits are formed by bores extending through walls of the center piece and wherein the bores extend from an area on the exterior of the body covered by the cap to a region of the body where the signal processing unit is connected to the body.

4. Apparatus according to claim 1 wherein the center piece, the connecting flanges and the receptacles for the measuring devices are made of a single piece of material.

5. Apparatus according to claim 1 wherein the flow meter body comprises a unitary, one-piece cast body.

6. Apparatus according to claim 1 wherein the center piece has at least two substantially planar mounting surfaces arranged on the exterior of the center piece and each forming at least one receptacle for a measuring device, the at least two mounting surfaces forming a mounting surface pair of diametrically opposed mounting surfaces, measurement devices arranged on opposite mounting surfaces defining a measurement axis, the mounting surfaces being further parallel to each other and angularly inclined relative to a longitudinal axis of the center piece.

7. Apparatus according to claim 6 wherein the mounting surface and the measurement device carried thereon are covered by a cap.

8. Apparatus for measuring at least one of a flow velocity and a volumetric through-flow of a fluid comprising a flow meter body of a unitary, one-piece construction defining a through conduit for the fluid with a longitudinal axis and having connecting flanges for connecting the body to a pipeline for the fluid, the body including a tubular center piece with at least two spaced-apart, open receptacles which are located at flat mounting surfaces on an exterior of the center piece and are arranged at an oblique angle relative to the longitudinal axis, a measurement device in each of the at least two receptacles, a signal processing unit located at a flat mounting area on the exterior of the center piece and attached to the exterior of the center piece, and electrical connectors extending from the measurement devices to the signal processing unit, the body having a wall with a plurality of protective conduits arranged inside the wall which house at least portions of the electrical connectors, each protective conduit including a first open end at the mounting surface and proximate the measurement device and a second end at the mounting area proximate the signal processing unit.

* * * * *